Oct. 29, 1963   A. D. HARMON ETAL   3,108,647
SELF-CORRECTING WEIGHING MACHINE AND METHOD
Filed Oct. 31, 1961   10 Sheets-Sheet 10

INVENTORS
Albert D. Harmon
William H. Drake
James C. Petrea
BY Bacon & Thomas ATTORNEYS

United States Patent Office 3,108,647
Patented Oct. 29, 1963

3,108,647
SELF-CORRECTING WEIGHING MACHINE AND METHOD
Albert D. Harmon, William H. Drake, and James C. Petrea, all of Durham, N.C., assignors to Sperry Rand Corporation, Wilmington, Del., a corporation of Delaware
Filed Oct. 31, 1961, Ser. No. 148,994
20 Claims. (Cl. 177—1)

This invention relates to charge forming and weighing machines and particularly to relatively high speed turret type machines for accurately weighing individual charges of fluent material and depositing those charges in containers.

In general the invention contemplates a novel method and apparatus wherein a bulk stream of the fluent material is fed to the machine at a uniform volumetric rate. The term "fluent material" is employed to refer to any and all materials suitable for the method described and may be such materials as cookies, crackers, cereals and the like. The uniform bulk stream of material is directed to a machine comprising multiplicity of individual weighing devices mounted for movement along a closed path and having individual weighing buckets arranged in side by side relation. In a preferred form, which will be described or illustrative of the invention, the weighing devices are mounted at the periphery of a rotatable turret. The turret is rotated at a uniform speed past the bulk feeding means, so that uniform-volume charges are deposited in each weighing bucket, each charge being preferably about 95% of the desired final weight. The turret further includes a supply of the material and dribble feed means for and movable with each weighing bucket, whereby the bulk charges are "topped off" to the exact desired weight, while the turret is rotating. The topping off or dribble feeding will be completed before each weighing device reaches a dumping zone and it is to insure that final weight be accurately achieved before that time that the present invention was made. According to the invention, the apparatus is arranged to start each individual dribble feed means immediately after its corresponding weighing device has passed the bulk feed station. The weighing devices are of a known type, wherein the achievement of the final desired weight produces a signal effective to stop operation of the dribble feed means. Thus, as long as the dribble feed means is operating, the desired weight has not been achieved.

Almost immediately after each dribble feed means is started, as described above, a detecting step is performed at a fixed station adjacent the turret to determine whether or not that dribble feed means is in fact, operating. If the dribble feed is not operating at that time, it means that the bucket already contains at least its full weight of material and may well contain an excess. This detecting step is performed at a fixed station at the start of a desired topping off zone. After the turret rotates through a predetermined angle, preferably about half way from the bulk feed to the dumping station, detecting means again operate to determine whether or not the dribble feed means is still operating. It is desired that the final weight be always achieved before this second detection step.

As will be obvious, if a dribble feed means is operating when it passes the first detection point, the bulk charge was not up to or beyond the desired final weight. On the other hand, if a dribble feeder is not operating at the first detection point, its bulk charge is too great. Conversely, if a dribble feeder is not operating at the second detection station, final weight has been achieved by that time, but if it is still operating, final weight has not been achieved within the desired period, meaning that the bulk charge was too small. Suitable circuits are provided whereby if the detection points indicate two or more bulk charges that are too great in one cycle of operation, a potentiometer is caused to operate to change either the rate of feed of bulk material or the rate of rotation of the turret to thereby reduce the size of the bulk charges. If the bulk charge speed is varied, it would have to be slowed down to reduce the desired charge. If the speed of the turret is altered the turret would have to be speeded up to reduce the size of each bulk charge.

One the other hand, if the second detection point detects two or more dribble feeders still operating as they passed that point, during any one cycle of rotation, it means that the bulk charges are too small and the machine will then operate, in one form, to increase the rate of feed of bulk material, or, in another form, to reduce the speed of rotation of the turret. Thus the machine automatically corrects itself, so that about 95% of the final weight is deposited in each bucket at the bulk feed station and topping off or final weight is achieved within the desired finish filling zone of rotation even though the density of the material may vary from time to time.

The invention includes many other refinements, including novel container controlling devices, novel weighing head features, and others, all of which will be described in more detail hereafter. Among the further novel features is a novel structural arrangement of the weighing head wherein all electrical components are housed in a readily accessible compartment closely adjacent the weighing head and a novel combined dash pot and differential transformer for detecting vertical movements of the weighing heads.

It is therefore an object of this invention to provide a novel weighing method and apparatus having bulk feed and dribble feed means arranged to achieve an accurate final weight before dumping the charges into containers and for automatically correcting itself when such results are not achieved.

It is another object of this invention to provide a method and apparatus as set forth wherein the machine is self correcting to achieve final weight in each weighing device within a limited predetermined arc of movement.

A further object is to provide a machine of the nature set forth comprising a rotary turret provided with a multiplicity of weighing heads each being electrically controlled and wherein all electrical components are housed within a readily accessible compartment and arranged for easy replacement and/or adjustment.

An additional object of the invention is to provide an apparatus of the type set forth including a novel and highly efficient vibratory dampening means in combination with a weighing head.

Another additional object is to provide a machine of the type set forth adapted to deposit its weighed charges in successive weighing containers, except when an incorrect weight arrives at the dumping station.

A further additional object of the invention is to provide a machine of the type set forth adapted to deposit its weighed charges in successive weighing containers and thereafter reject those containers containing underweight charges.

A still further object of the invention is to provide an apparatus of the type described which is relatively simple and economical to construct and yet highly efficient and dependable in operation.

Even further objects and advantages will be apparent to those skilled in the art as the description proceeds with reference to the accompanying drawings wherein:

FIG. 17 is a fragmentary plan view, similar to FIG. 7, but with certain parts omitted for clarity of illustration and showing a further embodiment of the invention;

FIG. 18 is a fragmentary plan view of a portion of the device shown in FIG. 17;

FIG. 19 is a vertical sectional view taken along the line 19—19 of FIG. 17; and, FIG. 20 is a fragmentary vertical sectional view taken along the line 20—20 of FIG. 17.

Figure 1:
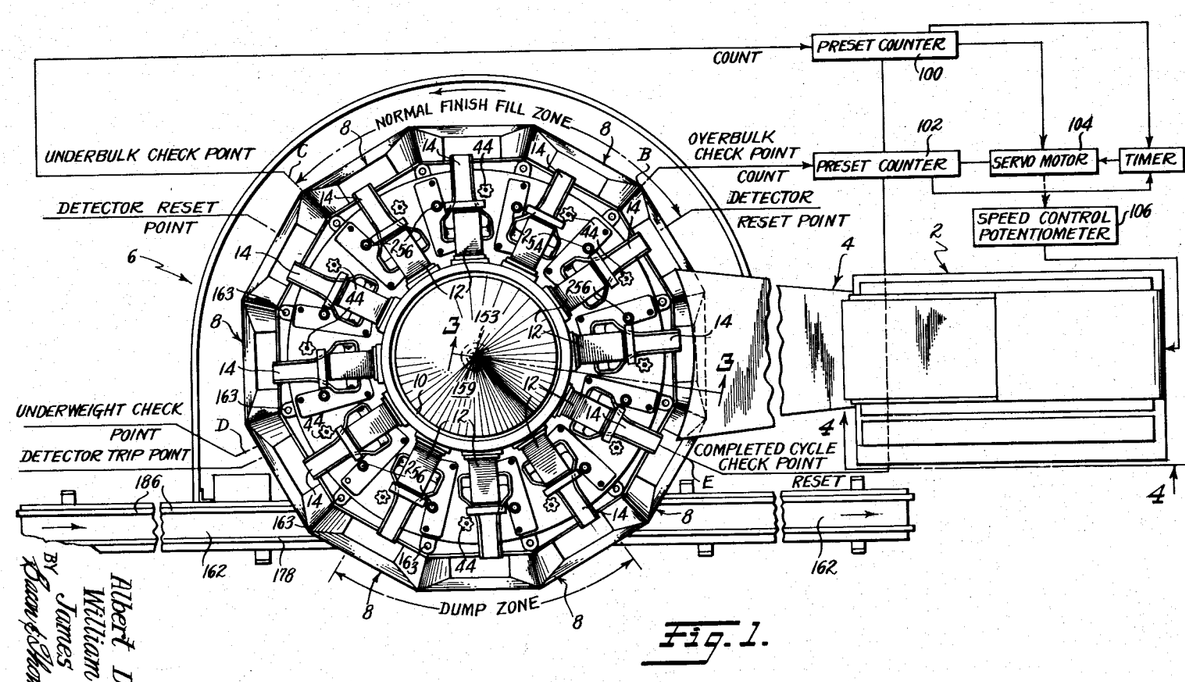
FIG. 1 is a diagrammatic top plan view of one form of apparatus embodying the present invention.
Figure 2:
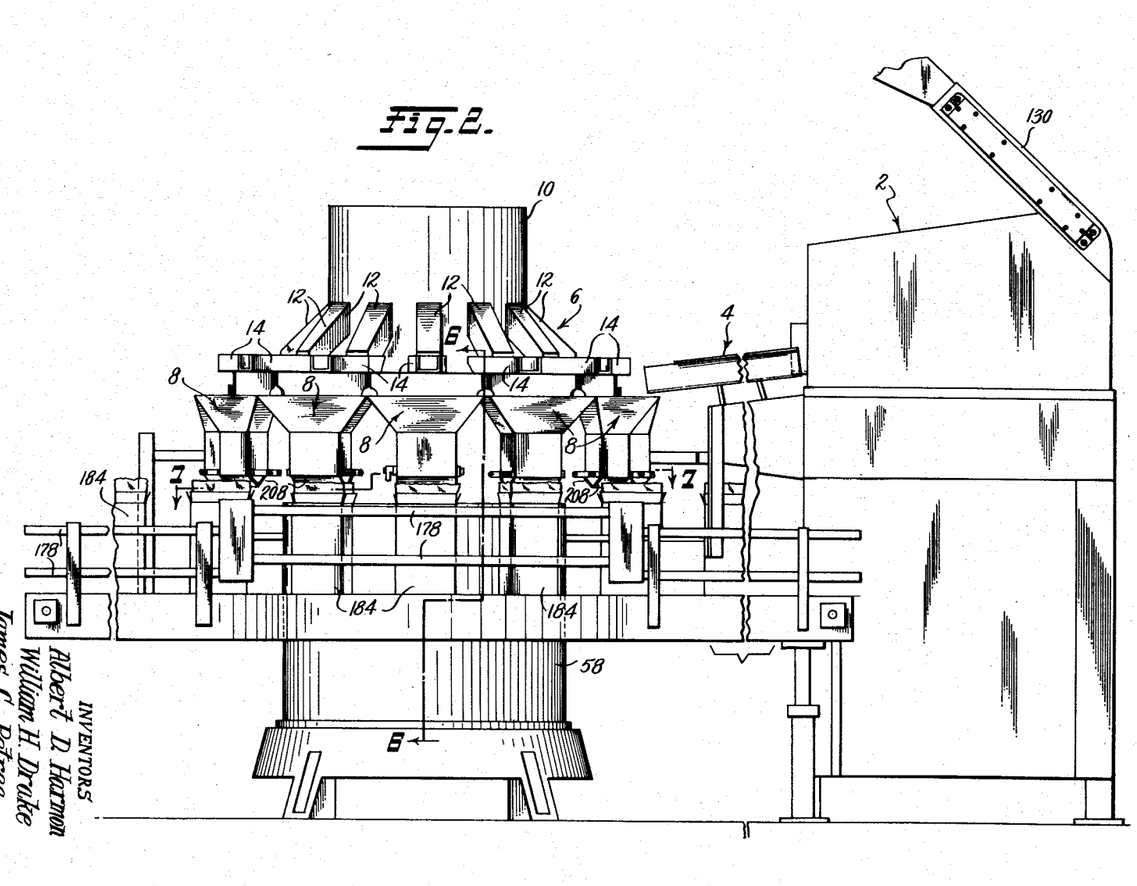
FIG. 2 is a side view with parts broken away, of the machine shown in FIG. 1.

Referring first to FIGS. 1 and 2, the apparatus shown therein comprises a bulk feed mechanism 2 arranged to deliver a volumetrically uniform stream of fluent material to bulk feed conveyor 4. The conveyor 4 is shown as a conventional vibratory conveyor and is arranged to deliver the stream of material to the periphery of a turret machine designated generally by numeral 6. The turret 6 is provided with a multiplicity, in the illustrated embodiment, twelve, weighing heads, each including a weighing bucket 8 arranged with its upper open end closely adjacent the weighing buckets on each side thereof. The bulk conveyor 4 deposits its material in weighing buckets 8 as the latter are carried by the turret 6 through the bulk feed station.

Each weighing bucket 8 is carried by a vertically movable weighing which will be described in greater detail later. Mounted on the turret 6 is a supply hopper 10 which is kept supplied with a suitable quantity of the fluent material being weighed. The hopper 10 delivers the fluent material, through chutes 12, to vibratory dribble feed conveyors 14, also mounted on the turret. There is a dribble feed conveyor 14 for each weighing head, and each is arranged to deliver an accurately controlled fine stream of material into its associated weighing bucket 8. The dribble feed conveyors 14 are more or less conventional type, employing an electrically operated vibrator to drive the same.

Figures 3, 14:
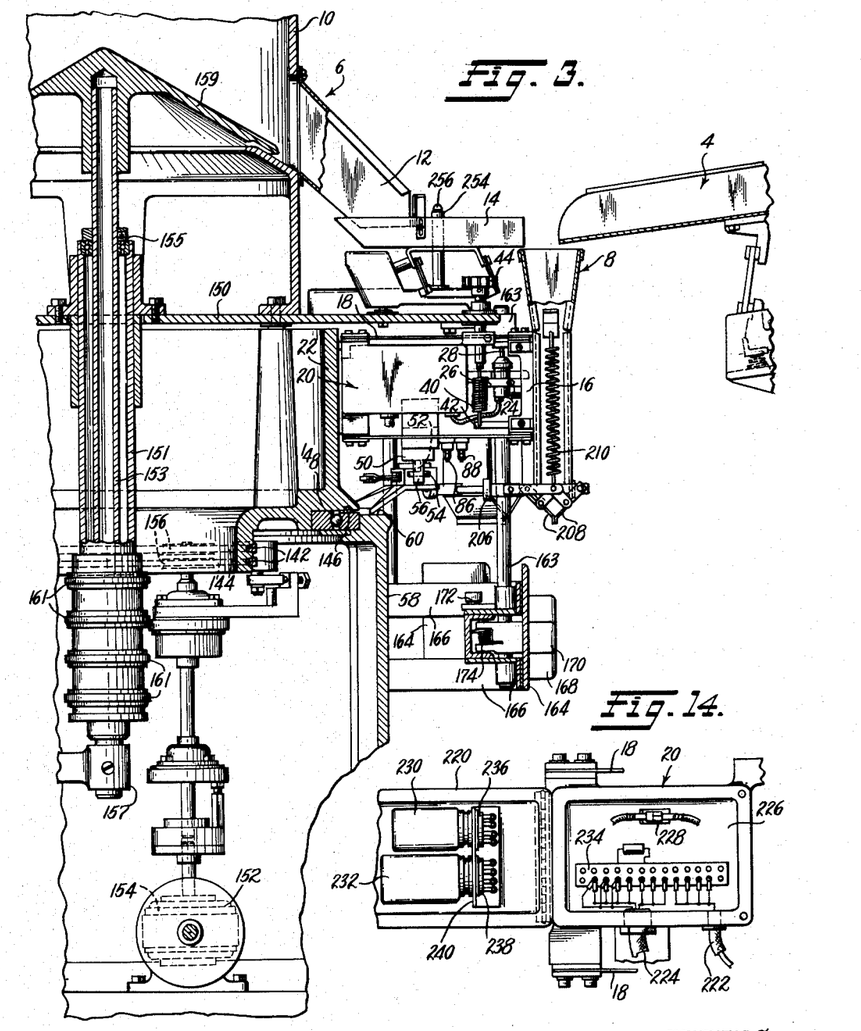
FIG. 3 is a fragmentary vertical sectional view on an enlarged scale, taken substantially along the line 3—3 of FIG. 1.
FIG. 14 is an enlarged detail view of the electrical compartment of a weighing head.
Figures 6, 9, 15:
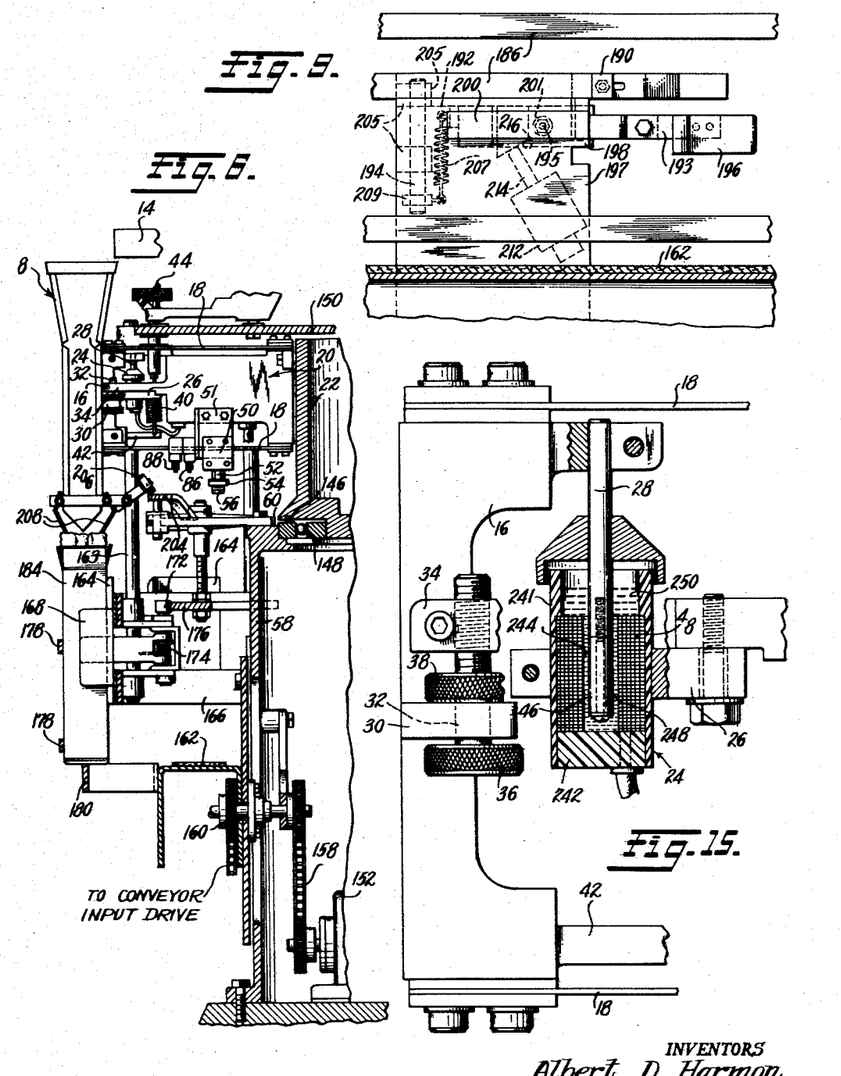
FIG. 6 is a vertical sectional view through a portion of the machine taken substantially along the line 6—6 of FIG. 2.
FIG. 9 is an elevational view, partly in section, of a portion of the machine as seen along the line 9—9 of FIG. 7.
FIG. 15 is an enlarged vertical view through a portion of one of the weighing heads and showing the details of the dash pot feature.

Referring now to FIGS. 3 and 6, each weighing bucket 8 is fixedly mounted on a support block 16 which is arranged vertically with its upper and lower ends respectively secured to horizontal leaf springs 18. The inner ends of the leaf springs 18 are secured to a box-like support 20 which in turn, is mounted on an upstanding annular flange portion 22 of the turret 6.

A differential transformer 24, to be described in greater detail later, is mounted on a bracket 26 carried by the support 20 and an actuator rod 28 is fixedly mounted on the block 16 for movement therewith. The block 16 is further provided with a laterally extended ear 30 (see also FIG. 15) through which a screw 32 freely slidably extends. The screw 32 is adjustably mounted on an extension 34 of the support arm 26 and can be threadedly adjusted therein. A head 36 and a nut 38 carried by the screw 32 limit the vertical movement of the block 16 to a very minute range of movement. A balancing spring 40 is attached to a lower arm 42 of the block 16 and its tension may be adjusted by means of a handwheel 44 to maintain the ear 30 in an upper position abutting the nut 38. The parts are so adjusted that no downward movement of the block takes place until the final weight of material is deposited in the weighing bucket 8. When that condition is achieved, a slight downward movement of block 16 moves rod 28 downwardly relatively to the differential transformer 24 and moves a paramagnetic core 46 in the field of coils 48 to produce a signal indicating achievement of final weight. That signal is employed, in a well-known manner, to stop operation of the associated dribble feed conveyor 14 and to thus terminate deposit of material in the associated weighing bucket 8. The structure of the weighing head and the basic features of the transformer as described above are more or less conventional and will be understood by those skilled in the art. It is believed that no further detailed description thereof will be necessary since the employment of such a signal to stop a feed conveyor is known.

Also mounted in fixed relation to each box-like support 20 is a solenoid 50 having vertically moving plunger 52 provided with an enlarged detector head 54 in the lower end thereof. The solenoid 50 is mounted on bracket 51 which in turn is secured to support 20. A retainer strap 56 limits the downward movement of the plunger 52. Each solenoid 50 is so arranged in the operating circuit for its dribble feed conveyor 14 that when the conveyor is in operation, the plunger 52 is in its lowermost position with head 54 substantially resting on strap 56. When the dribble feed conveyor 14 is de-energized and not operating, the plunger 52 is pulled to its uppermost position and held in that position.

The turret structure includes a fixed drum-like frame portion 58 provided with an upper edge surface 60 extending peripherally therearound. A plurality of detecting switches are mounted on brackets secured to the surface 60 in position to be engaged by the head 54, previously described, or a fixed lug 62 (see FIG. 10) carried by the turret portion 22.

Referring now again to FIG. 1, one of the switches referred to is mounted on the frame at point B, which will be referred to hereafter as a second fixed station. Other similar switches are fixedly mounted at points C, D and E, which will respectively be referred to as third, fourth and fifth fixed stations.

Figures 8, 12, 13:
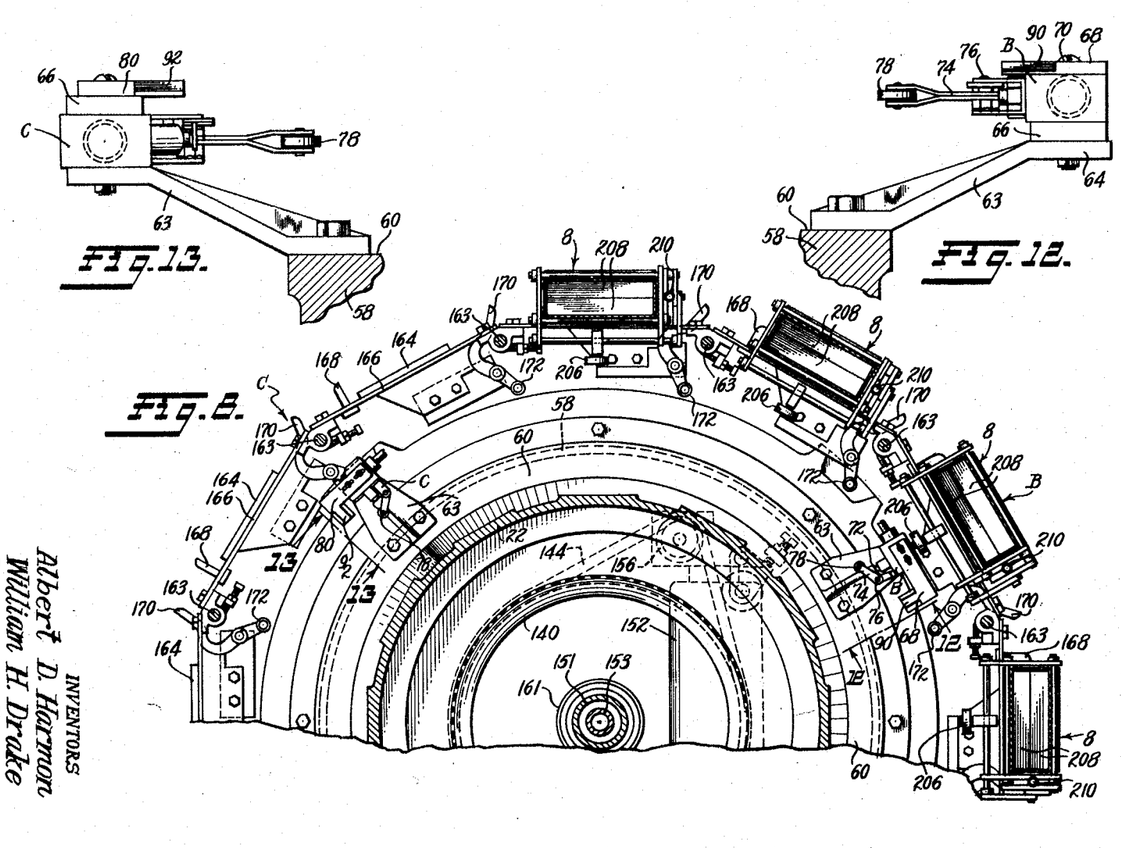
FIG. 8 is a sectional view similar to that of FIG. 7, but showing the opposite portion of the turret.
FIGS. 12 and 13 are views similar to FIGS. 10 and 11, but showing similar parts of the machine as seen along the lines 12—12 and 13—13 respectively of FIG. 8.
Figure 11:
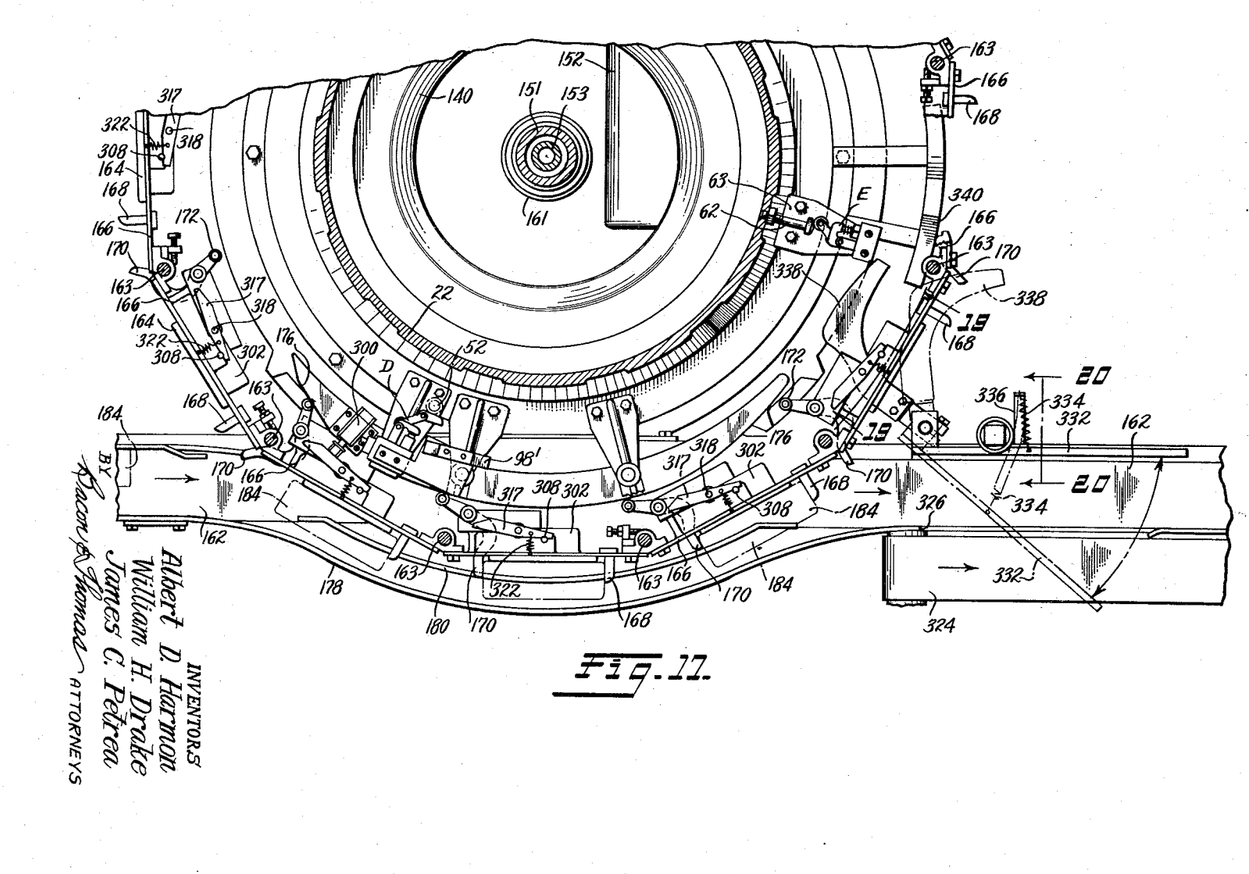

All of the switches are of similar construction, FIG. 12 being representative. For convenience, each of the essentially identical switches at stations B, C, D and E will also be identified by those same letters.

As shown in FIG. 12, a bracket 63, secured to the surface 60 previously described, extends radially outwardly of the frame and is formed with a supporting portion 64. A spacer block 66 rests on the supporting portion 64, the switch B rests on the block 66 and a cam plate 68 rests on the switch B. The cam plate, switch and spacer block are all secured to the bracket 63 by a bolt 70 or the like. The switch B comprises internal contacts (not shown) operable by a splunger 72 (see FIG. 8) which in turn is actuated by a lever 74 pivoted to the switch structure at 76 and carrying a roller 78 at its outer end. The switch C at station C (see FIG. 13) may be considered to be identical in structure to the switch B just described, but it is to be noted that at station C the switch C rests directly on the bracket 63 and spacer block 66 is on top of the switch and supports a cam plate 80 at the same level as the cam plate 68 at station B. It will thus be apparent that the roller 78 of switch B is at a higher elevation than the roller 78 of switch C. The brackets 63 and switches B and C are so proportioned and dimensioned that one or the other of their rollers 78 extend into the path of movement of the detector head 54 previously described as being in the lower end of the plunger 52 of solenoid 50. Thus, it will be apparent that if a dribble feed conveyor 14 is operating as it passes station B, its associated detector head 54 will be in its lower position and will pass beneath the roller 78 of switch B. On the other hand, if that dribble feed conveyor is not operating, its detector head 54 will be in its upper position and will engage roller 78 of switch B to momentarily close the switch and produce a signal pulse, which will be referred to later.

It will likewise be apparent that switch C at station C will be operated to generate a signal pulse if a dribble feed conveyor is still operating as it passes that station, whereas the detector head 54 will pass over the roller 78 of switch C without operating that switch when a non-operating dribble feed conveyor passes that station.

Figures 7, 10, 11:
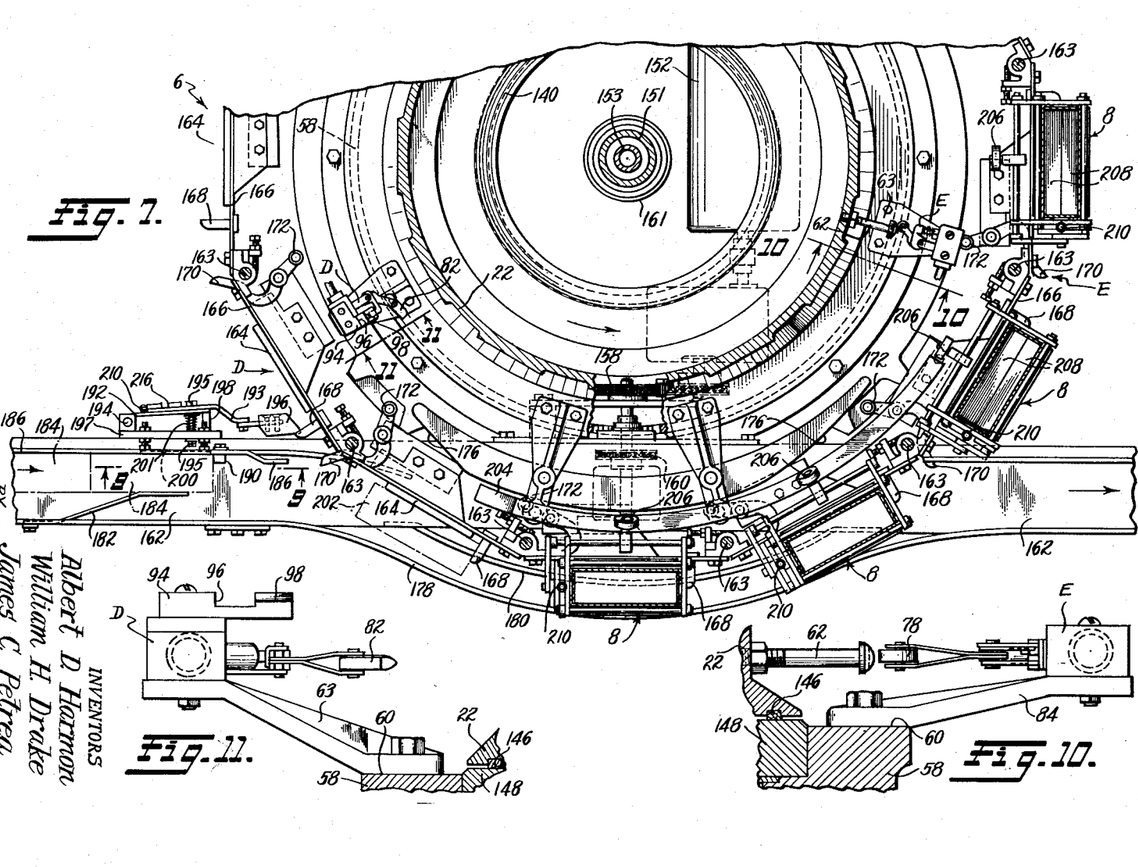
FIG. 7 is an enlarged horizontal section taken along line 7—7 of FIG. 2.
FIGS. 10 and 11 are respectively fragmentary sectional views on an enlarged scale, of portions of the machine as seen along lines 10—10 and 11—11 respectively of FIG. 7.

The switch D (FIG. 11) is provided with a shoe 82 rather than a roller 78, but may otherwise be identical to the switches B and C. From FIG. 11 it will be apparent that switch D is at a lower elevation than switch B and corresponds to switch C in that it will be momentarily closed when a dribble feeder that is still operating passes the station D. FIG. 10 shows the switch E at station E. It is to be noted that the bracket 84 upon which switch E is mounted, is of slightly different configuration than the brackets 63 in that it positions switch E at a lower level than switches C or D. Roller 78 of switch E is in position to be engaged by a stud 62 fixed to the flange portion 22 of turret 6. There is only one stud 62 on the turret and it actuates switch E once each revolution of the turret.

Referring again to FIGS. 3 and 6, a pair of identical switches 86 and 88 is mounted on the same bracket 51 that supports the solenoid 50 on each weighing head. The outermost switch 88 is arranged in the control circuit for its associated dribble feed conveyor 14 so that upon actuation of switch 88, its dribble feed conveyor is energized and started in operation. Each of the innermost switches 86 is also in the dribble feed conveyor circuit, but when actuated these switches function to stop operation of the dribble feed conveyor. The cam plate 68 at station B (see FIGS. 8 and 12) is provided with a camming portion 90 arranged in the path of movement of the outermost switches 88. The cam plate 80 at station C is likewise provided with a camming portion 92 in the path of movement of each outermost switch 88. At station D, (FIG. 11) a cam plate 94 is provided with a groove or passageway 96 through which the switches 88 pass without being actuated, but a camming portion 98 thereof is arranged to engage the innermost switch 86 of each pair.

Referring now to FIG. 1, the schematically shown boxes contain various control instrumentalities including a counter 100 and a counter 102. The counter 100 receives and accumulates pulses from the switch C, whereas counter 102 receives and accumulates pulses from the switch B. These counters may be of any suitable or conventional form. The switch E is arranged to reset each of the counters 100 and 102 once during each revolution of the turret 6. From the structure and features as described, it will be apparent that each weighing bucket 8 receives a bulk charge from the conveyor 4 and immediately thereafter its switch 88 is actuated by camming portion 90 to start its associated dribble feed conveyor 14. If the bulk weight already in the bucket is equal to or exceeds the predetermined desired weight, the operation of the differential transformer 24 will prevent actual operation of the dribble feed conveyor, whereas if the bulk charge is below the predetermined weight, that dribble feed conveyor will actually start operating. Almost immediately after the switch 88 is actuated, the weighing head passes station B and if its dribble feeder is operating at that time the detector head 54 will miss roller 78 of switch B and no signal will be sent to counter 102. However, if the bulk charge equals or exceeds the desired fixed weight, the detector head 54 will be in its upper position and will actuate switch B to send a pulse to counter 102. If two or more such pulses are accumulated by counter 102 before the counters are reset by switch E, a control signal is sent to servo motor 104 to adjust speed control potentiometer 106 to thereby slow down the rate of feed from bulk feed mechanism 2 and to thereby reduce the size of each bulk charge. The structure and operation of bulk feed mechanism 2 will be described in more detail later. Obviously, the accumulation of exactly two pulses by a counter 100 or 102 is not critical; any desired number of pulses may be used to control servo motor 104.

Assuming that the bulk feeder 2 deposits underweight portions in each weighing bucket 8, the dribble feed conveyors 14 will start operating just before reaching station B. It is desired that the bulk feed charges be so adjusted that the dribble feed conveyor 14 will complete "topping off" each charge to its predetermined desired weight before reaching station C. It will be recalled that roller 78 of switch C is at a lower elevation than the roller of switch B. Thus, the switch C will be actuated by each detector head 54 that passes station C in its lowermost position (that is when its corresponding dribble feed conveyor is still operating). Each time switch C is actuated it sends a pulse to counter 100 and it means that the final desired weight has not yet been deposited in that bucket 8. If two (or any other desired number) such pulses are accumulated by the counter 100 before the counters are reset by switch E, the counter sends a control signal to servo motor 104 to operate the potentiometer 106 in a reverse direction to thereby speed up the rate of metering material from bulk feed mechanism 2 so that the dribble feed conveyors 14 then finish topping off each charge before it reaches station C.

The camming portion 92 of cam plate 80 at station C is engaged by switch 88 shortly after weight detection by switch C at station C. Thus a starting impulse is sent to each dribble feed conveyor after it passes station C to restart the same in the event the dribble feeder was stopped erroneously, such as by vibrations or the like. If the dribble feeder was stopped erroneously it will start again at this time to complete the charge. However, if full weight has been achieved in that bucket, actuation of switch 88 by cam 92 will have no effect since the operation of differential transformer 24 will prevent actual operation of the dribble feed conveyor.

Switch D at station D again detects whether or not a dribble feed conveyor is still operating at that point. If it is operating, it means that its bucket has not yet accumulated the required weight of material and the switch D then operates to prevent depositing of that underweight charge in a container in a manner that will be described hereinafter. Immediately after passing station D each innermost switch 86 is actuated by cam 98 (FIG. 11) to stop operation of the adjacent dribble feed conveyors, whether or not full weight has been accumulated in the bucket.

Figures 4, 5:
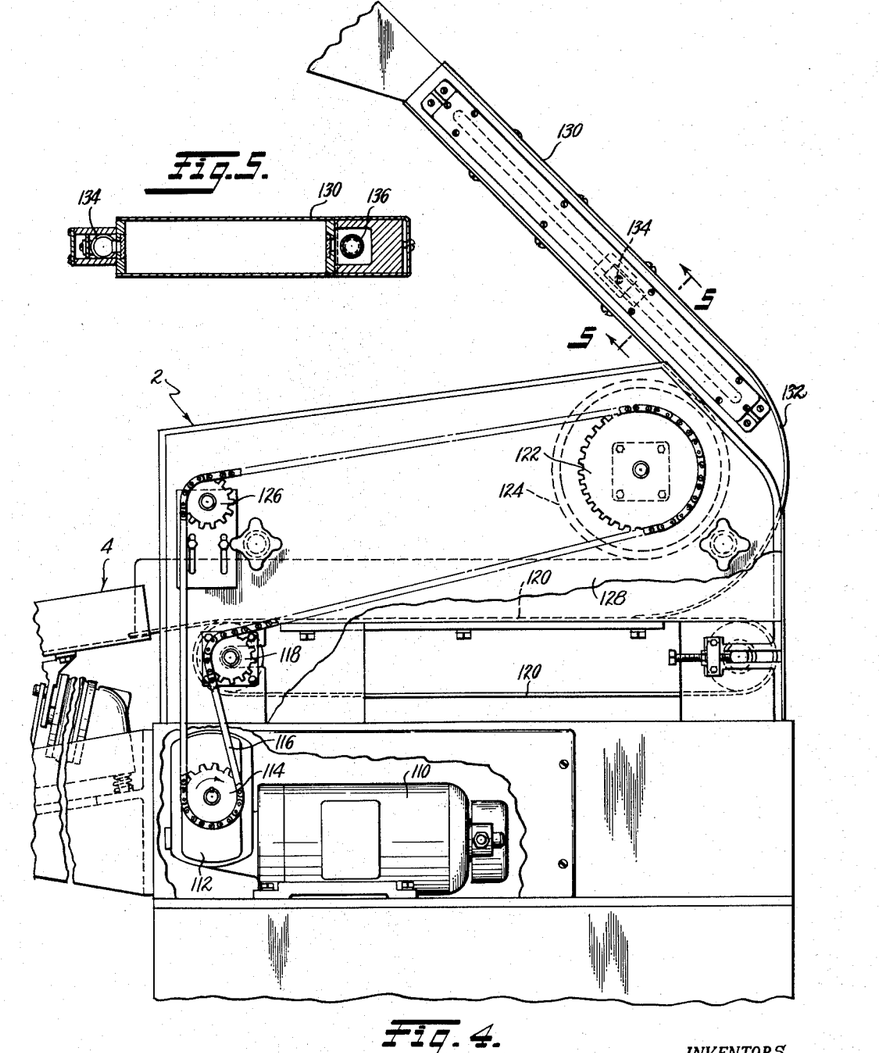
FIG. 4 is a side view of the bulk feeder, on an enlarged scale, as seen from the line 4—4 of FIG. 1 with certain parts broken away.
FIG. 5 is a transverse sectional view along the line 5—5 of FIG. 4.

The bulk feed mechanism 2 controlled by servo motor 104 and potentiometer 106 is shown in greater detail in FIGS. 4 and 5. The bulk feed mechanism comprises a driving motor 110, the speed of which is controlled by the potentiometer 106. Such motors and potentiometers are well known and need not be described in further detail. The motor 110 drives through a reduction gear box 112 to an output sprocket 114. The sprocket 114 drives chain 116. Chain 116 is trained over a driving sprocket 118 arranged to drive an endless belt conveyor 120 of more or less conventional construction. The belt conveyor 120 delivers material to the bulk conveyor 4 previously referred to. The chain 116 is also trained over a driving sprocket 122 arranged to drive a metering drum 124. A suitable idler sprocket 126 is arranged to maintain chain 116 taut and is adjustably mounted for that purpose. The parts are so dimensioned that the surface speed of the periphery of metering drum 124 is the same as the surface speed of belt 120. Suitable side plates 128 confine the fluent material to the passageway between the drum 124 and belt 120. A sloping chute 130 is arranged to receive the fluent material from any suitable source and to accumulate a column of material above the metering drum 124. Outer guide plate 132 is arranged generally concentric to the drum 124 to guide the material between the drum and belt 120 and to define a substantially uniform-in-area passageway to the belt 120. It is preferred that means be provided to insure the presence of a column of material in the chute 130 at all times. For this purpose a light source and photosensitive device 134 and 136 respectively, are arranged on opposite sides of the chute 130 and arranged to stop the entire machine if the level of material in the chute drops below a set level and to again restart the machine when the material in the chute has been replenished to the preset level. It will be apparent that varying the speed of the motor 110 will also vary the volumetric rate at which the fluent material is delivered to the bulk conveyor 4 and that the rate of delivery will be uniform and constant until the speed of motor 110 is again changed.

Referring again to FIG. 3, the rotary turret 6 includes an upstanding circular flange 22 previously described and a downwardly extending hollow pulley portion 140 provided with grooves 142 in its outer periphery for receiving driving belts 144. The turret is supported on the drumlike base 58 by means of an annular thrust bearing 146 and is accurately guided in rotary movement by anti-friction bearings 148. A top plate 150 is supported on the turret and serves as a support for the dribble feed conveyor 14 for hopper 10 and its associated elements.

The plate 150 supports a central tubular member 151 which is fixed to plate 150 and which in turn, supports an axial shaft or tube 153 by bearing, one of which is shown at 155. A bracket 157 is secured to the lower end of shaft 153 and is fixed to frame 58 to hold shaft 153 against rotation. A conical cap 159 is carried at the upper end of shaft 153 and constitutes a stationary floor or material director for rotary hopper 10.

The tubular member 151 is provided with a plurality of insulated slip rings 161 engageable by fixed wipers (not shown) for establishing electrical connections between electrical components carried by the turret and the base, respectively.

A driving motor 152 drives at one end through a suitable gear box 154 and through suitable transmission mechanism to a pair of pulleys 156 about which the drive belts 144 are trained. Thus the motor 152 drives the turret 6 in rotation at a uniform and constant speed. The other end of motor 152 (FIG. 6) drives through a chain 158 to a sprocket 160 arranged to drive a container conveyor 162. It is to be noted that conveyor 162 for containers operates at a speed that is fixed in relation to speed of rotation of the turret.

Referring now to FIGS. 1, 6 and 7, the container conveyor 162 extends generally tangentially of the turret 6 and passes through the zone labelled in FIG. 1 as "Dump zone." It is to be further noted that the conveyor 162 extends below the turret 6 to the dump zone and radially inwardly of the weighing buckets 8. Secured to and depending from the horizontal turret plate 150 are spaced rods 163, there being one such rod between each pair of weighing heads. The rods 163 extent a substantial distance below the weighing buckets 8 and their lower portions are joined by plates or straps 166. Below each bucket 8 the straps or plates 166 support a pad or plate 164. The plates 166 are also provided with fixed lugs or abutments 168 near the leading edge of each pad 164. Adjacent the rear edge of each pad 164 is a pivoted clamp member 170 having a cam follower roller 172 at its inner end. A spring 174 (FIGS. 3 and 6) is arranged to urge each of the clamping arms 170 to rotate in a clockwise direction as seen in FIG. 7. A fixed cam 176 is provided with camming portions arranged to swing the clamping arms 170 to engage the trailing edge of a container or carton and lightly clamp the same against the fixed abutment 168 while the carton is resting against the pad 164.

As seen in FIG. 7, the conveyor 162 for the cartons is provided with outer guide rails 178 extending concentrically outward of the turret 6 through the dump zone. Adjacent but below the guide rails 178 in the area of the dump zone is a supporting rail 180 on which the cartons slide through the dump zone as they are carried laterally off the conveyor 162 by the turret. A deflection spring 182 is arranged to urge all incoming containers or cartons 184 to the upper side of the conveyor 162 as seen in FIG. 7 and against inner guide rails 186. A stop block 190 is fixed to the guide rails 186 and normally holds the containers 184 against further advancing movement.

A lever 192 (see also FIG. 9) journalled on a vertical pivot pin 194 pivotally supports a second lever 193 having a head 196 arranged to normally extend into the path of movement of fixed lugs 168. The second lever 193 is pivoted to lever 192 on a stud 195. An arm 198 fixed to the lever 192 extends outwardly below the upper guide rail 186 and carries a pusher plate 200 at its outer end. A compression spring 201 surrounds stud 195 and bears against a fixed plate 197 to urge lever 192 rearwardly. Each time lub 168 engages the head 196, it swings the lever 192 downwardly as seen in FIG. 7 and pusher plate 200 thus pushes the leading carton 184 downwardly to clear the stop 190. Spring 182 yields with sufficient ease to permit this function. When the leading carton 184 is pushed clear of the stop 190, conveyor 162 carries it toward the turret in time to engage and lie against a pad 164 and adjacent the associated lug 168. At about the same time the carton and turret reach the position shown by dotted lines at 202, the roller 172 engages the leading edge of the cam 176 to swing clamp arm 170 to a position to clamp the carton against the lug 168. The cam 176 extends through the dumping zone and acts to hold the carton clamped against the pad 164 and directly below an associated weighing bucket 8 (see also FIG. 6).

While each weighing bucket is passing through the dumping zone, a fixed cam 204 engages a cam-follower 206 to open bottom closures 208 of each bucket 8 and thus dump the contents into the carton 184 therebelow. The closures 208 are normally held closed by a tension spring 210 (see FIG. 3) the cam 204 extends only through the dump zone. After the contents of the bucket have been dumped into a carton and that carton reaches the end of the dump zone, the roller 172 passes off cam 176 to release the carton to the outgoing portion of conveyor 162.

The lever 192, previously described, is also described as being journalled on a vertical shaft 194. The shaft 194 is supported in brackets 205 (see FIG. 9) and vertically fixed. A tension spring 207 is anchored at one end to a collar 209 on the shaft 194 and at its upper end it is anchored to the adjacent end of second lever 193 and biases the same to the position shown wherein head 196 carried thereby at the elevation of the path of movement of lugs 168. A solenoid 212 (shown only by dotted line in FIG. 9) is provided with a movable plunger 214 arranged to engage a block 216 mounted on the second lever 193. When solenoid 212 is energized, it forces plunger 214 upwardly to thereby lift the left end of second lever 193 by pivoting lever 193 about stud 195 to lower head 196 to a position below the path of movement of lugs 168. The switch D previously described is normally open and may be in series with the solenoid 212 so that closing of switch D will energize the solenoid. Since switch D is at a lower level than switch B, it will be actuated by a detector head 54 when the latter is in its lowermost position, thus indicating that the associated dribble feed conveyor is operating. Thus, if a dribble feed conveyor is still operating as it passes station D, it means that its bucket has not yet accumulated the required weight of material and switch D will be actuated to energize solenoid 212 momentarily so that lever 193 is swung downwardly to pull its head out of path of movement of adjacent lug 168. The lug will therefore not swing the lever 192 to release a carton from behind stop 190. The result is that no carton will be delivered to the turret below a bucket 8 that contains less than the required weight of material. As previously described, the cam 98 engages the innermost switch 86 to stop operation of any dribble feed conveyors that might be running at the time they pass station D. Thus, an underweight charge in any bucket will not be delivered to a carton but will be dumped in the dump zone. Suitable collecting means, not shown, are provided for receiving such dumped underweight charges and for returning them to the bulk feed supply or to the hopper 10 as may be desired.

Referring now to FIG. 14, the box-like compartment 20 previously referred to is in the form of a hollow compartment having a door 220 hinged to the inner edge thereof. Suitable cables 222 and 224 lead electrical conductors into the compartment 226 from the various switches described, the differential transformer 24 and other electrical components of the machine. The circuits will not be described in detail since the manner of arranging same will be obvious to those skilled in the art, and all of the wiring is not shown in FIG. 14. However, all possible electrical components such as a rectifier 228 and relays and detectors, indicated as 230 and 232, along with a suitable terminal strip 234 are located in the compartment 226 when the door 220 is closed. Numerals 230 and 232 indicate certain components which may be relays and/or detectors and associated circuitry, mounted in containers having conventional prongs thereon, connected to the circuitry therein, and removably mounted in sockets 236 and 238 carried by a bracket 240 mounted on the inner face of door 220. By this arrangement the electrical components may be serviced, replaced, or adjusted by simply opening the door 220 and without necessitating complete or even partial dismantling of any part of the machine. Each compartment can be reached between the lower portions of buckets 8, as clearly evident from FIG. 2. The compartment 226 in box 20 is located between the leaf spring 18 and closely adjacent the switches 86 and 88, the solenoid 50, conveyors 14 and differential transformers 24, thus keeping the length of wiring to a minimum, and serving to make the entire machine highly compact.

Referring now to FIG. 15, the differential transformer 24 comprises an outer shell portion 241 closed and sealed at its bottom by a plug member 242. The differential transformer coils 48 are housed within the shell 241 and are arranged to define a vertical passageway 244 therethrough. The rod 28 is of non-magnetic material, for example aluminum, whereas the core portion 46 is of paramagnetic material so as to vary the coupling between the different coils (not separately identified) upon relative movement between the coils and core. At least the core 46 is of a dimension to move freely into the passageway 244 but sufficiently large to define, with the inner surface of the coils, a restricted annular passageway 248. A suitable dampening oil or other liquid 250 placed in the shell 241 and is of sufficient depth so that at least the core 46 and the coils 48 are completely submerged. The liquid 250 functions as a dampening means, the core 46 and the passageway 248 having the characteristics of a dash pot, to dampen vibrations that might otherwise cause spurious signals in the associated circuitry. A particular advantage of the arrangement shown is that the dampening means (dash pot) is coincident with the movable core and there is no possibility for vibrations to be generated between the movable core and the dampening means, as would be the case where a separate dash pot were used externally of the differential transformer.

As shown in FIG. 3, a post 254 is mounted on the turret plate 150 alongside each dribble feed conveyor 14 and each carries a signal light 256 to indicate visually that its associated conveyor 14 is operating.

Figure 16:
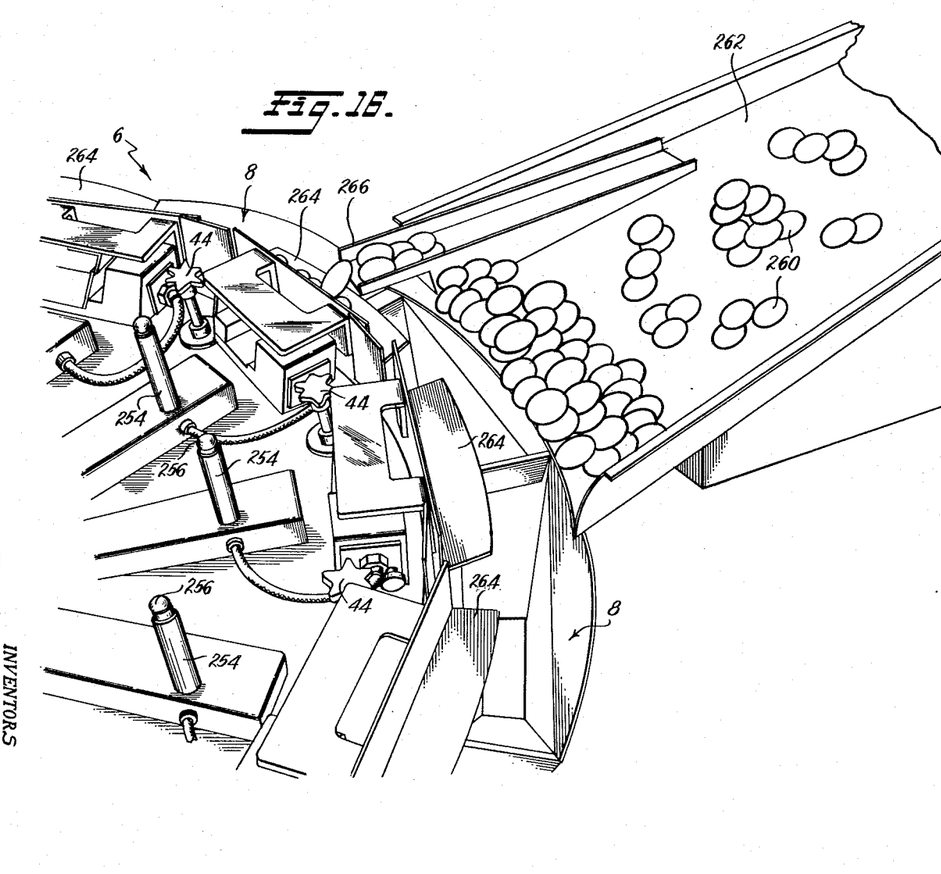
FIG. 16 is a fragmentary perspective view of a portion of a second embodiment incorporating the present invention.

FIG. 16 diagrammatically shows a modified form of the invention. The embodiments shown and described in FIGS. 1 through 15 contemplate the adjustment of the speed of operation of the bulk feed mechanism in response to the detected signals at stations B and C. The embodiment of FIG. 16 on the other hand, contemplates the adaptation of the invention to a machine for use where little, if any leeway is permitted in regulating the rate of bulk feed. For example, a weighing and packaging machine intended to receive a product such as the cookies or crackers 260 directly from an oven, must be operated in such a manner that it will accept the product at the same rate it is delivered from the oven, which is not controllable at this machine. The machine of FIG. 16 is such a machine and it receives the product 260 from a previous process and delivers the product by means of bulk feed vibratory conveyor 262 to the weighing buckets 8 of a weighing machine which may in most respects be identical to that described in FIGS. 1 through 15. In this embodiment, however, the speed control potentiometer 106, previously described, is not arranged to control the speed of the bulk feeder, but rather is arranged to control the speed of the turret driving motor 152. To practice this invention, it is only necessary that the relative rate of delivery of bulk product and speed of turret be maintained constant, to insure delivery of uniform bulk charges to the weighing buckets. The only change necessary in the circuitry described in connection with FIG. 1, is to cause the speed control potentiometer to speed up the turret motor 152 in response to conditions that would dictate slowing down the motor driving the bulk feed mechanism 2, and vice versa. The apparatus of FIG. 16 further differs from FIGS. 1 through 15 in that the dribble feed conveyors 264 are in the form of ledges or shelves having an end of each overlying a bucket 8. A ramp structure 266 is fixed to the upper vibratory surface of the conveyor 262 and part of the product is diverted thereto. The ramp 266 terminates at its delivery end over the shelves on dribble feed devices 264 to deliver a small stream of the product thereto. The small quantity of the material delivered to the shelves 264 is sufficient to top off each bulk charge in one cycle of operation. In other respects, the machine of FIG. 16 may be identical to that previously described.

In the embodiment shown in FIGS. 17 to 20, the charges from successive weighing buckets are dumped into corresponding containers irrespective of whether or not any particular charge is underweight. Detecting, control and rejecting means are provided, as will be described, for later rejecting those containers in which underweight charges have been deposited.

In FIG. 17 all parts bearing the same reference numerals as referred to in the previous embodiments are identical thereto. In this embodiment the container releasing mechanism actuated by head 196 described in connection with FIG. 7 is retained to release containers in timed relation to approach of the weighing buckets to the dumping station. However, the solenoid 212 of FIG. 9 is omitted and lever 193 is not pivoted for vertical movement so that a container is released and fed to the dumping station to meet each and every weighing bucket. The switch D of FIG. 7, which detects the approach of an underweight charge to the dumping station, is repositioned in the embodiment of FIG. 17 to a position much closer to the dumping station itself than in the embodiment of FIG. 7. This gives the machine more time to achieve final weight, resulting in fewer rejects. The switch D is mounted on the same type of bracket as described in connection with FIG. 7 and fixedly mounted adjacent the switch is a solenoid 300 (see also FIG. 18). Actually the switch D and solenoid 300 are mounted substantially directly over the cam 176 described in connection with FIG. 7 and also shown in FIG. 17.

Figures 18, 19, 20:
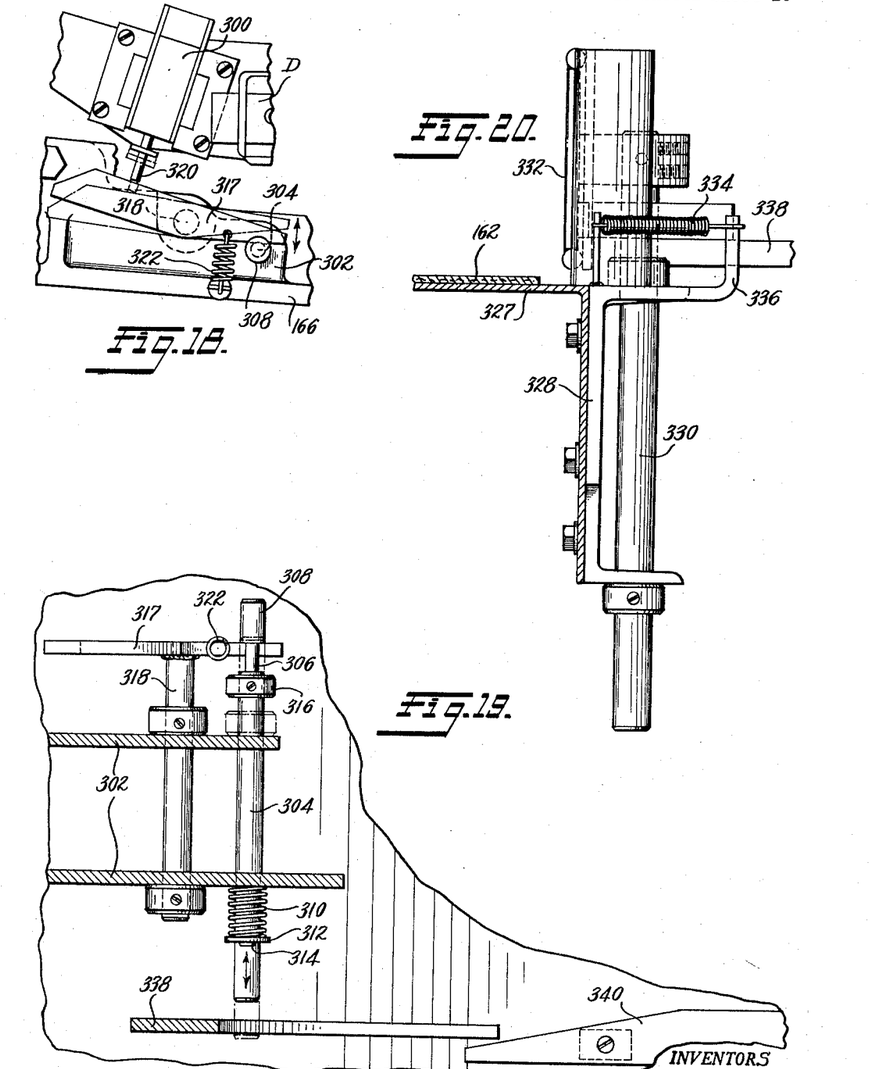

The plates 166 extending between vertical rods 163 of the turret also support a bracket 302 on which a part of a rejecting mechanism is mounted. By referring to FIGS. 18 and 19 it will be seen that the brackets 302 each support a vertically slidable pin 304 having a restricted neck portion 306 above the bracket 302 and an enlarged elongated head 308 at its upper end. A compression spring 310 surrounds the pin 304 below bracket 302 and bears against the latter and a washer 312 held in place by cotter key 314 or the like on pin 304. The pin 304 is further provided with a fixed but adjustable stop collar 316 arranged to bear against the upper surface of bracket 302 to limit downward movement of pin 304 under the influence of spring 310. A latch lever 317 is fixed to the upper end of a shaft 318 which is journalled in the bracket 302 and has an arm portion extending into proximity to the pin 304 and another arm portion which moves past and closely adjacent the outer end of armature or plunger 320 of solenoid 300. A tension spring 322 is secured at one end to the latch lever 316 and is secured at its other end to a portion of plate 166 or any other element fixed relative thereto. When the pin 304 is in its uppermost position, as shown in full lines in FIG. 19 the spring 322 holds the latch lever 317 with its first end against the reduced neck portion 306 of pin 304 and under head 308, thus holding the pin 304 in its upper position. The solenoid 300 is such that, when energized, its armature 320 is projected outwardly. As seen in FIG. 18, outward or downward projection of the armature plunger 320 causes the same to rock, in a counterclockwise direction, whichever latch lever 317 is passing it at the time to thus withdraw its latching end from beneath head 308 of its associated pin 304 and this permits spring 310 to project that pin 304 downwardly to the dotted line position of FIG. 19. As can be seen from FIG. 19, when pin 304 is in its lowermost position, as determined by stop collar 316, the upper portion of enlarged head 308 still projects to and slightly above the level of the latch lever 317 so that the latter bears against the side surface of head 308.

As previously described, the containers or cartons 184 are delivered to the machine by a conveyor 162 which extends under a portion of the turret inwardly of the dumping station and again receives the filled containers to take them away from the machine. In the embodiment now being described, a further take-away conveyor 324 is provided alongside the conveyor 162 at the discharge side of the machine. The guide rail 178 is provided with a gap 326, adjacent conveyor 324, large enough to permit a container 184 to be pushed laterally from conveyor 162 to conveyor 324. FIG. 20 shows a fragmentary portion of a frame member 327 which supports at least a part of the upper run of conveyor 162 at the discharge side of the machine. Fixed to the frame member 327 is a bracket 328 in which a vertical shaft 330 is journalled alongside the conveyor 162. Above the bracket 328 the shaft 330 has fixed thereto a deflector or rejection plate or arm 332 arranged to swing over the conveyor 162 in the manner shown by dotted lines in FIG. 17. A tension spring 334, having its ends fixed respectively to the arm 332 and an extension 336 of bracket 328, normally holds the arm 332 in its retraced position shown in full lines in FIG. 17. Also fixed to shaft 330 is a cam shaped lever 338 which extends towards the center of the machine turret, below the bracket 302 and in the path of movement of the lower end of pin 304 when the latter is in its lowermost position, as previously described. When the pin 304 is in its uppermost position, its lower end passes over the cam lever 338 without engaging the same. As clearly shown in FIG. 17, the cam lever 338 is provided with an inner and leading edge so shaped as to give the desired motion to the arm 332.

After the lower pin 304 engages and actuates cam lever 338 and then releases the same to spring 334, it engages a stationary cam 340 which forces the pin 304 upwardly to its uppermost position, at which time the latch lever 317 snaps under head 308 and the pin is then conditioned for a repeat cycle of operation.

FIG. 7 shows a cam 98 for actuating switch 86 to reset detector plunger 52. FIG. 17 shows that in this embodiment of the invention a cam 98' is mounted adjacent the switch D for performing that same function.

In operation of the machine of this embodiment, the weighing and detecting functions are identical to those described with reference to previous embodiments and it will be remembered that detector plunger 52 will be in its lowermost position as long as its dribble feed mechanism is operating, thus indicating that the charge of material in its corresponding weighing bucket is not up to full weight. When a charge in a bucket is not up to full weight by the time that bucket reaches a position adjacent the switch D, plunger 52 will actuate switch D, in the manner previously described, to energize solenoid 300. At that time the bracket 302 and latch lever 317 is directly opposite the plunger 320 of the solenoid and outward movement of that plunger trips the latch lever to release its associated pin 304 in the manner previously described. Also, a container 184 has been released and is carried through the dumping station with the underweight charge, which is dumped into it at that station. However, the pin 304 associated with that particular bucket is in its lowermost position and when that bucket reaches the position where its pin 304 engages cam lever 338, the container in which the underweight charge was dumped is opposite the deflecting arm 332. Continued rotation of the turret causes pin 304 to swing cam lever 338 and deflecting arm 332 in a clockwise direction, to the dotted line position of FIG. 17. It is obvious that such movement of the arm 332 will push the container having the underweight charge therein laterally off conveyor 168, through the gap 326 and onto reject conveyor 324.

While a limited number of specific embodiments and features have been described and shown herein, it is to be understood that they are merely illustrative of the principles of the invention, which is not to be limited thereto. It is contemplated that the invention be limited only by the scope of the appended claims.

We claim:

1. The method of forming equal predetermined-weight charges of fluent material, comprising the steps of: sequentially moving a plurality of material weighing devices around a closed path through a plurality of fixed stations; moving said devices through at least a first one of said stations at a uniform rate; continuously directing a uniform bulk stream of material from a bulk supply into said weighing devices while at said first one of said stations and at a uniform rate whereby equal bulk charges are deposited in each of said weighing devices; detecting whether the weight of material in each of said weighing devices is underweight or at least full weight as it passes each of second and third stations; feeding a dribble stream of material, between said second and third stations, into each weighing device whose charge is underweight when it passes said second station; changing one of said uniform rates to decrease the size of said bulk charges in response to passage of charges of at least full weight past said second station, and to increase the size of said bulk charge in response to passage of underweight charges past said third station.

2. The method of claim 1 wherein the uniform rate of delivery of said bulk stream is changed to vary the size of said bulk charges.

3. The method of claim 1 wherein the uniform rate of movement of said weighing devices is changed to vary the size of said bulk charges.

4. The method of claim 1 including the further steps of: moving containers through a fourth station as said weighing devices move therethrough; dumping predetermined-weight charges from said weighing devices into said containers at said fourth station; blocking movement of a container into said fourth station upon arrival, at said fourth station, of a weighing device containing a charge of incorrect weight; dumping said incorrect charge in said fourth station; and returning the material of said dumped incorrect charge to said bulk supply.

5. Weighing and charge-forming apparatus comprising: a plurality of weighing devices; each including a weighing bucket; means mounting and guiding said devices for movement around a closed path through a plurality of fixed stations; means for feeding a bulk stream of material into said buckets as they pass through a first one of said stations; driving means for moving said devices through said first station at a uniform rate; driving means for said bulk feeding means; dribble feed means for each of said weighing buckets, movable therewith, and arranged to deliver a dribble stream of said material thereinto; control means, operable in response to a predetermined weight in said bucket, for stopping operation of said dribble feed means; detecting means at a second and third of said stations for detecting whether the weight of material in a bucket passing therethrough is below or at least equal to said predetermined weight; and regulating means responsive to said detecting means for changing the speed of operation of one of said driving means to decrease the bulk charge deposited in each bucket when the weight in buckets passing said second station is at least equal to said predetermined weight and to increase the bulk charge deposited in each bucket when the weight in buckets passing said third station is below said predetermined weight.

6. Apparatus as defined in claim 5 wherein said regulating means is arranged to change the speed of the driving means for said bulk feeding means.

7. Apparatus as defined in claim 6 wherein said bulk feeding means comprises; a conveyor for delivering material to said first station; a hopper for holding a supply of material; and metering means for controlling the rate of release of material from said hopper to said conveyor, said driving means for said bulk feeding means being arranged to drive said metering means.

8. Apparatus as defined in claim 5 wherein said regulating means operate to change the speed of said driving means for moving said weighing devices.

9. Apparatus as defined in claim 5 including starting means adjacent said second station for starting operation of said dribble feed means as an underweight charge passes said second station, said starting means being ineffective to start said dribble feed means when a charge of at least said predetermined weight passes said second station.

10. Apparatus as defined in claim 5 wherein said detecting means comprise a feeler element adjacent said path; a movable element on each weighing device movable thereon between a first position wherein it engages said feeler element and a second position wherein it misses said feeler element; and means for holding said movable element in one of said positions when its associated dribble feed means is operating and in the other of said positions when its associated dribble feed means is not operating.

11. Apparatus as defined in claim 10 including; means for feeding containers through a fourth station as said buckets pass therethrough and means at said fourth station for dumping the charges from all buckets passing therethrough; means for blocking entry of a container into said fourth station when a bucket carrying an underweight charge approaches said fourth station; and stationary means adjacent said path, responsive to said movable element for actuating said blocking means when a dribble feed means is operating as it approaches said fourth station.

12. Apparatus as defined in claim 11 including means adjacent said fourth station for stopping operation of any dribble feed means which is operating as it passes the same.

13. Weighing and charge forming apparatus comprising; a plurality of weighing devices, each including a weighing bucket; means mounting and guiding said devices for movement around a closed path through a plurality of fixed stations; means for depositing material in said buckets and including a dribble feed means movable with each bucket; means operable in response to deposit of a predetermined weight of material in a bucket for stopping operation of its dribble feed means; means at a dumping station for dumping the charges from said buckets; means for feeding containers through said dumping station to receive the charges from said buckets; blocking means for preventing entry of a container into said dumping station; and control means responsive to approach of an underweight bucket to said dumping station for actuating said blocking means.

14. Apparatus as defined in claim 13 including a movable element on each of said weighing devices and movable between two positions thereon; means holding said movable element in a first position when its associated dribble feed means is operating and in its second position when said dribble feed means is not operating; said control means being engageable by said movable element only when in one of said positions.

15. Weighing and charge forming apparatus comprising; a rotary turret; a plurality of weighing devices, each including a weighing bucket, mounted on said turret; driving means for rotating said turret at a uniform rate; bulk feeding means adjacent said turret for feeding material into said buckets at a uniform rate throughout a fixed arc of rotation of said turret; driving means for operating said bulk feeding means at said uniform rate; a dribble feed means on said turret for each of said buckets; means responsive to movement of each weighing bucket past said bulk feeding means for starting its associated dribble feed means only after each has passed said bulk feed means and means responsive to the weight of material in each bucket to stop said dribble feed means when a predetermined weight of material has been deposited in its associated bucket; a dumping station arcuately spaced from said bulk feed means; and control means between said dumping station and said bulk feeding means and responsive to the condition of said dribble feed means for changing the speed of one of said driving means whereby to change the size of each bulk charge so that said predetermined weight of material in each bucket is achieved within a predetermined arc of movement between said bulk feed means and said dumping station.

16. Apparatus as defined in claim 15 including a supply hopper on said turret; said dribble feed means comprising a conveyor for each bucket for conveying material from said supply hopper to said buckets; said control means being arranged to change the speed of said driving means for said bulk feeding means.

17. Apparatus as defined in claim 15 wherein each of said dribble feed means comprises a conveyor on said turret; said bulk feeding means including means for depositing a small quantity of material on each of said dribble feed conveyors as it moves through said fixed arc of rotation; said control means being arranged to change the speed of said driving means for rotating said turret.

18. Weighing and charge forming apparatus comprising; a plurality of weighing devices, each including a weighing bucket; means mounting and guiding said devices for movement around a closed path through a plurality of fixed stations; means for depositing material in said buckets and including a dribble feed means movable with each bucket; means operable in response to deposit of a predetermined weight of material in a bucket for stopping operation of its dribble feed means; means at a dumping station for dumping the charges from said buckets; means for feeding containers through said dumping station to receive the charges from said buckets; control means responsive to approach of an underweight bucket to said dumping station; and rejecting means responsive to said control means for directing the container receiving the material from said underweight bucket to a different path from that followed by other containers leaving said dumping station, said rejecting means including a member movable with each weighing bucket but movable relative thereto between first and second positions; means urging said member to said second position; latch means normally holding said member in said first position; said latch means being releasable by said control means upon approach of an underweight bucket to said dumping station; and deflecting means actuated by said member, after its associated bucket passes through said dumping station, when said member is in its said second position, for deflecting from its normal path the container which received the material from said underweight bucket.

19. Apparatus as defined in claim 18 wherein said deflecting means comprises a lever pivotally mounted adjacent the path of movement of said weighing buckets; said lever extending into the path of movement of said member when it is in its said second position.

20. Apparatus as defined in claim 18 including a stationary cam adjacent the path of movement of said member for moving said member back to its first position after actuation of said deflecting means.

References Cited in the file of this patent

UNITED STATES PATENTS

| | | |
|---|---|---|
| 446,266 | Ostenberg | Feb. 10, 1891 |
| 493,796 | Smyser | Mar. 21, 1893 |
| 620,063 | Valder | Feb. 21, 1899 |
| 2,126,377 | Fear et al. | Aug. 9, 1938 |
| 2,227,640 | Ferguson | Jan. 7, 1941 |
| 2,616,652 | Rose et al. | Nov. 4, 1952 |
| 2,712,408 | Weber | July 5, 1955 |
| 2,720,375 | Carter | Oct. 11, 1955 |
| 2,818,888 | Atwood | Jan. 7, 1958 |
| 2,868,375 | Howard | Jan. 13, 1959 |
| 2,901,209 | Bardy et al. | Aug. 25, 1959 |
| 2,922,611 | Aust | Jan. 26, 1960 |